US012511922B2

(12) United States Patent
Farre Guiu et al.

(10) Patent No.: US 12,511,922 B2
(45) Date of Patent: Dec. 30, 2025

(54) AUTOMATED CONTENT ANALYSIS AND ANNOTATION

(71) Applicant: Disney Enterprises, Inc., Burbank, CA (US)

(72) Inventors: Miquel Angel Farre Guiu, Bern (CH); Monica Alfaro Vendrell, Barcelona (ES); Marc Junyet Martin, Barcelona (ES); Francesc Josep Guitart Bravo, Lleida (ES); Albert Aparicio Isarn, Barcelona (ES); Pablo Pernias, Sant Joan d'Alacant (ES); Steven S. Shapiro, Pasadena, CA (US); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 499 days.

(21) Appl. No.: 17/675,953

(22) Filed: Feb. 18, 2022

(65) Prior Publication Data
US 2023/0267754 A1 Aug. 24, 2023

(51) Int. Cl.
*G06V 20/70* (2022.01)
*G06V 10/42* (2022.01)
(Continued)

(52) U.S. Cl.
CPC ............. *G06V 20/70* (2022.01); *G06V 10/42* (2022.01); *G06V 10/44* (2022.01); *G06V 10/70* (2022.01);
(Continued)

(58) Field of Classification Search
CPC ........ G06V 20/70; G06V 10/42; G06V 10/44; G06V 10/70; G06V 20/30; G06V 30/414;
(Continued)

(56) References Cited

U.S. PATENT DOCUMENTS 8,301,999 B2 10/2012 Olson
10,157,318 B2 12/2018 Smolic et al.

OTHER PUBLICATIONS

"Of Nhu-Van Nguyen et. al., Comic MTL: Optimized Multi-Task Learning for Comic Book Image Analysis, Jul. 2019, International Journal on Document Analysis and Recognition, vol. 22, pp. 265-284" (Year: 2019).*

(Continued)

*Primary Examiner* — Chineyere Wills-Burns
*Assistant Examiner* — Phuong Hau Cai
(74) *Attorney, Agent, or Firm* — Farjami & Farjami LLP

(57) ABSTRACT

A system includes a computing platform having processing hardware, and a systems memory storing a software code. The processing hardware is configured to execute the software code to receive content including an image having multiple image regions, determine boundaries of each of the image regions to identify multiple bounded image regions, identify, within each of the bounded image regions, one or more local features and one or more global features, and identify, within each of the bounded image regions, another one or more local features based on a comparison with corresponding local features identified in each of one or more other bounded image regions. The processing hardware is further configured to execute the software code to annotate each of the bounded image regions using its respective one or more local features, its other one or more local features, and its one or more global features, to provide annotated content.

20 Claims, 7 Drawing Sheets

(51) Int. Cl.
- *G06V 10/44* (2022.01)
- *G06V 10/70* (2022.01)
- *G06V 20/30* (2022.01)
- *G06V 30/414* (2022.01)
- *G06V 30/42* (2022.01)

(52) U.S. Cl.
CPC ............ *G06V 20/30* (2022.01); *G06V 30/414* (2022.01); *G06V 30/42* (2022.01); *G06V 2201/131* (2022.01)

(58) Field of Classification Search
CPC ............. G06V 30/42; G06V 2201/131; G06V 10/7753; G06V 10/774; G06V 10/25
See application file for complete search history.

(56) References Cited

OTHER PUBLICATIONS

Christophe Rigaud et. al., "Knowledge-driven Understanding of Images in Comic Books, Apr. 2015, International Journal on Document Analysis and Recognition IJDAR, vol. 18, pp. 199-221" (Year: 2015).*

"Randy Duncan, Toward a Theory of Comic Book Communication, 2000, Henderson State University" (Year: 2000).*

"Clement Guerin et. al., An ontology-based framework for the Automated Analysis and Interpretation of Comic Books' Images, Feb. 2017, Information Sciences, vol. 378, pp. 109-130" (Year: 2017).*

"Ilan Manouach et. al., A Deep Learning Pipeline for the Synthesis of Graphic Novels, 2021, International Conference of Computational Creativity ICCC 21" (Year: 2021).*

"Anise Shaw, An Introduction to Graphic Novels: Sequences, Jul. 2011, Tutorials, Cloudscapecomics.com" (Year: 2011).*

"YingLi Tian et. al., Robust and Efficient Foreground Analysis in Complex Surveillance Videos, Oct. 2011, Machine Vision and Applications, vol. 23, pp. 967-983" (Year: 2011).*

Runmin Cong, Jianjun Lei, Huazhu Fu, Ming-Ming Cheng, Weisi Lin and Qingming Huang "Review of Visual Saliency Detection with Comprehensive Information" IEEE Transactions on Circuits and Systems for Video Technology, 2018 pp. 1-19.

* cited by examiner

AUTOMATED CONTENT ANALYSIS AND ANNOTATION

BACKGROUND

Due to its nearly universal popularity as a content medium, ever more visual media content is being produced and made available to consumers. As a result, the efficiency with which visual images can be analyzed, annotated, and rendered searchable has become increasingly important to the producers, owners, and distributors of that visual media content.

Annotation of visual media content is typically performed manually by human annotators, also known as "taggers." However, such manual annotation, or "tagging," is a labor intensive and time consuming process. Moreover, in a typical visual media production environment there may be such a large number of images to be annotated that manual tagging becomes impracticable. In response, various automated systems for performing content tagging have been developed. While offering efficiency advantages over traditional manual techniques, automated tagging systems are especially challenged by particular types of visual media content. For example, comics, graphic novels, and Japanese manga present stories about characters with features depicted from the perspectives of drawing artists with different styles that often change over time in different comic or manga issues, within the same comic or manga issue, in different graphic novels in a series, or within the same graphic novel. Moreover, a drawing artist might use different drawing qualities to emphasize different features across the arc of a single storyline. Those conditions make automating comic, graphic novel, and manga indexing for search particularly challenging, in so far as an automated system might only recognize a subset of the drawing styles. Consequently, there a need in the art for automated systems and methods for analyzing and annotating visual media content that substantially minimizes the amount of such content that needs to be manually processed.

DETAILED DESCRIPTION

Figure 1:
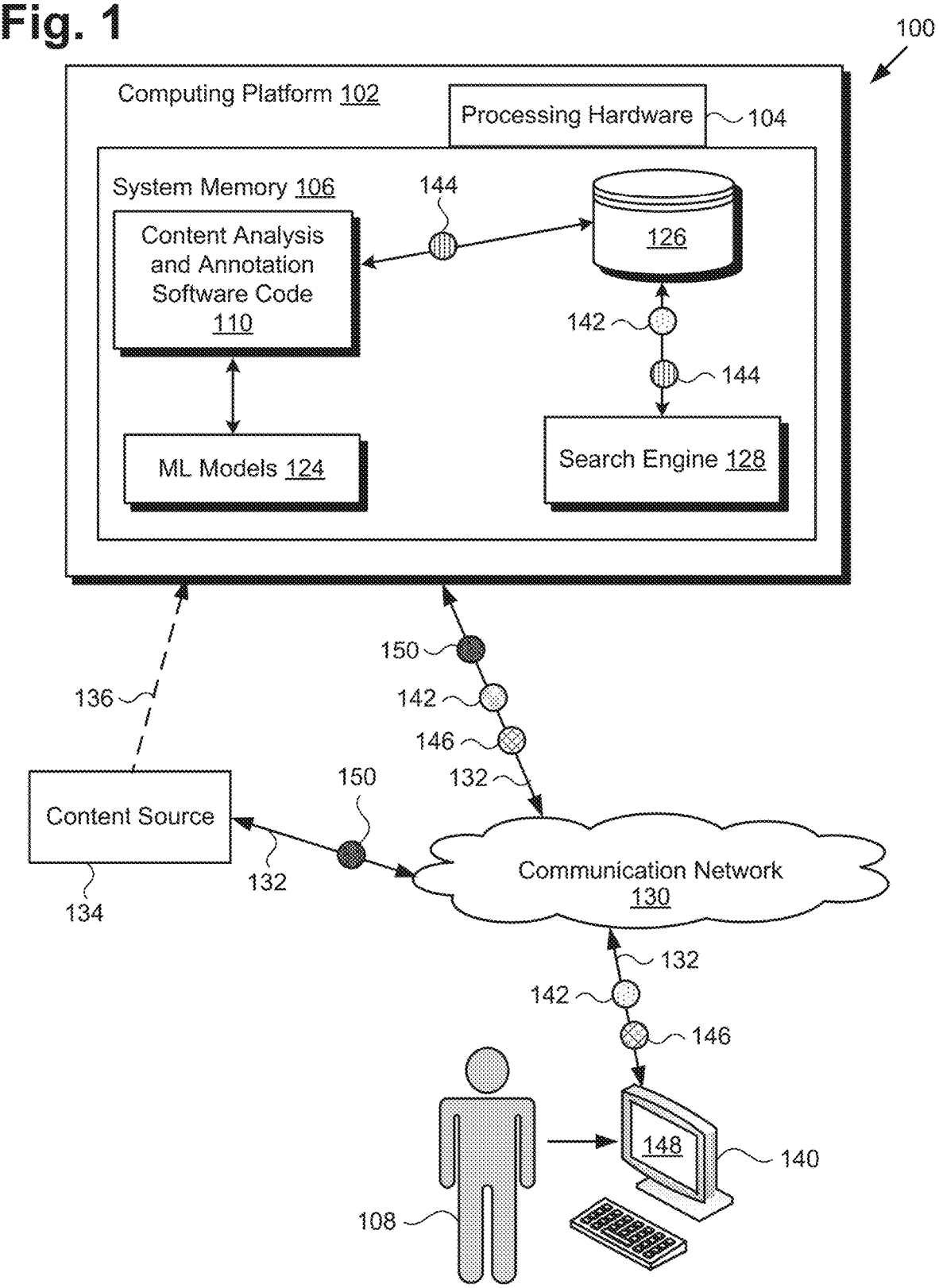
FIG. 1 shows a diagram of an exemplary system for automating content analysis and annotation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, although the annotation, or "tagging," of visual media content has traditionally been performed manually by human annotators, also known as "taggers," the cost and time required by that human involvement has made automating that annotation process desirable. Nevertheless, particular types of visual media content continue to prove problematic for existing automated tagging systems. For example, and as also noted above comics, graphic novels, and Japanese manga present stories about characters with features depicted from the perspectives of drawing artists with different styles that often change over time in different comic or manga issues, within the same comic or manga issue, in different graphic novels in a series, or within the same graphic novel. Moreover, a drawing artist might use different drawing qualities to emphasize different features across the arc of a single storyline. Those conditions make automating comic, graphic novel, and manga indexing for search particularly challenging, in so far as an automated system might only recognize a subset of the drawing styles.

The present application discloses systems and methods for automating content analysis and annotation that address and overcome the special challenges posed by comics, graphic novels, manga, and other visual media content in which a page or other discrete subsection of the content may be a composite of distinctive image regions. For example, a page from a comic book, graphic novel, or manga may present a composite image including multiple distinctive image regions in the form of "panels," as known in the art. It is noted that although the present solution is described below in detail by reference to the exemplary use case of analyzing and annotating comics, graphic novels, and manga (hereinafter simply "comics"), the present novel and inventive principles may more generally be applied to an visual media content, such as rough sketches, photos, illustrated books, and video, for example to increase the consistency and accuracy with which annotations are applied to such content by automated annotation systems and methods.

It is noted that, as defined in the present application, the expression "local feature" or "local features" refer to one or more individual objects or actions depicted within a comics panel, while the expression "global feature" or "global features" refers to a visual impression produced by the comics panel as a whole. By way of example, a comics panel may include local (individual) features such as one or more of "grass," "trees," and "benches." Where grass and trees, but not benches, are present, a global feature of the comics panel may be "forest," thereby identifying an environment in which the local features are situated. Alternatively, where grass and benches, or grass, trees, and benches are present, a global feature of the comics panel may be "park," thereby identifying a different environment in which the local features are situated.

With respect to the feature "panels," it is further noted that a comics panel may be considered to be analogous to a video frame that captures a portion of a shot or scene of video at a particular instant in time. In the context of video, a "shot" refers to a sequence of video frames that is captured from a unique camera perspective without cuts and other cinematic transitions. Moreover, a "scene" refers to a sequence of shots that correspond to one another thematically, either by sharing a common background or location, or by being directed to the same event, i.e., series of actions. As defined in the present application, a "relationship" among sequential comics panels analogous to a shot of video may refer to one in which the perspective from which the related panels are drawn does not change, although the local features portrayed within the panels may change. Alternatively, or in addition, as further defined in the present application, a "relationship" among sequential comics panels analogous to a scene of video may refer to one in which global features remain the same despite a change or changes in the perspective from which the related panels are drawn.

It is also noted that, as defined in the present application, the terms "automation," "automated," and "automating" refer to systems and processes that do not require the participation of a human user, such as a human editor or system administrator. For example, although in some implementations a human system administrator may review the performance of the systems and methods disclosed herein, and, in some cases may modify the annotations applied to media content by the present systems and methods, that human involvement is optional. Thus, in some implementations, the processes described in the present application may be performed under the control of hardware processing components of the disclosed systems.

Moreover, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data. In various implementations, NNs may be trained as classifiers and may be utilized to perform image processing or natural-language processing.

FIG. 1 shows a diagram of exemplary system 100 for automating content analysis and annotation, according to one implementation. System 100 includes computing platform 102 having processing hardware 104, and system memory 106 implemented as a computer-readable non-transitory storage medium. As shown in FIG. 1, according to some implementations, system memory 106 stores content analysis and annotation software code 110, trained machine learning models 124 (hereinafter "trained ML models 124"), content search database 126, and in some of those implementations, also stores search engine 128.

As further shown in FIG. 1, system 100 may be implemented in a use environment including content source 134 providing visual media content 150 (hereinafter "content 150"), communication network 130, and user 108 utilizing user system 140 including display 148. In addition, FIG. 1 shows network communication links 132 communicatively coupling content source 134 and user system 140 with system 100 via communication network 130. Also shown in FIG. 1 are annotated content 144 corresponding to content 138, search data 142 received from user system 140, and search results 146 generated by search engine 128.

It is noted that although system 100 may receive content 150 from content source 134 via communication network 130 and network communication links 132, in some implementations, content source 134 may take the form of a content source integrated with computing platform 102, or may be in direct communication with system 100, as shown by dashed communication link 136. It is further noted that, in some implementations, system 100 may omit one or both of content search database 126 and search engine 128. Thus, in some implementations, system memory 106 may store content analysis and annotation software code 110 and trained ML models 124, but not content search database 126 or search engine 128.

With respect to the representation of system 100 shown in FIG. 1, it is noted that although content analysis and annotation software code 110, ML models 124, content search database 126, and search engine 128 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts content analysis and annotation software code 110, ML models 124, content search database 126, and search engine 128 as being mutually co-located in system memory 106, that representation is also merely provided as an aid to conceptual clarity. More generally, system 100 may include one or more computing platforms such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that content analysis and annotation software code 110, ML models 124, content search database 126, and search engine 128 may be stored remotely from one another within the distributed memory resources of system 100. It is also noted that, in some implementations, one or n e of ML models 124, and search engine 128 when included in system 100, may take the form of software modules included in content analysis and annotation software code 110.

Processing hardware 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as content analysis and annotation software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as ML modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although user system 140 is shown as a desktop computer in FIG. 1, that representation is provided merely as an example as well. More generally, user system 140 may be any suitable mobile or stationary computing device or system that implements data processing capabilities sufficient to provide a user interface, support connections to communication network 130, and implement the functionality ascribed to user system 140 herein. For example, in other implementations, user system 140 and may take the form of a laptop computer, tablet computer, or smartphone.

With respect to display 148 of user system 140, display 148 may be physically, integrated with user system 140, or may be communicatively coupled to but physically separate from respective user system 140. For example, where user system 140 is implemented as a smartphone, laptop computer, or tablet computer, display 148 will typically be integrated with user system 140. By contrast, where user system 140 is implemented as a desktop computer, display 148 may take the form of a monitor separate from user system 140 in the form of a computer tower. Furthermore, display 148 of user system 140 may be implemented as a liquid crystal display (LCD), a light-emitting diode (LED) display, an organic light-emitting diode (OLED) display, a quantum dot (QD) display, or any other suitable display screen that performs a physical transformation of signals to light.

Figure 2A:
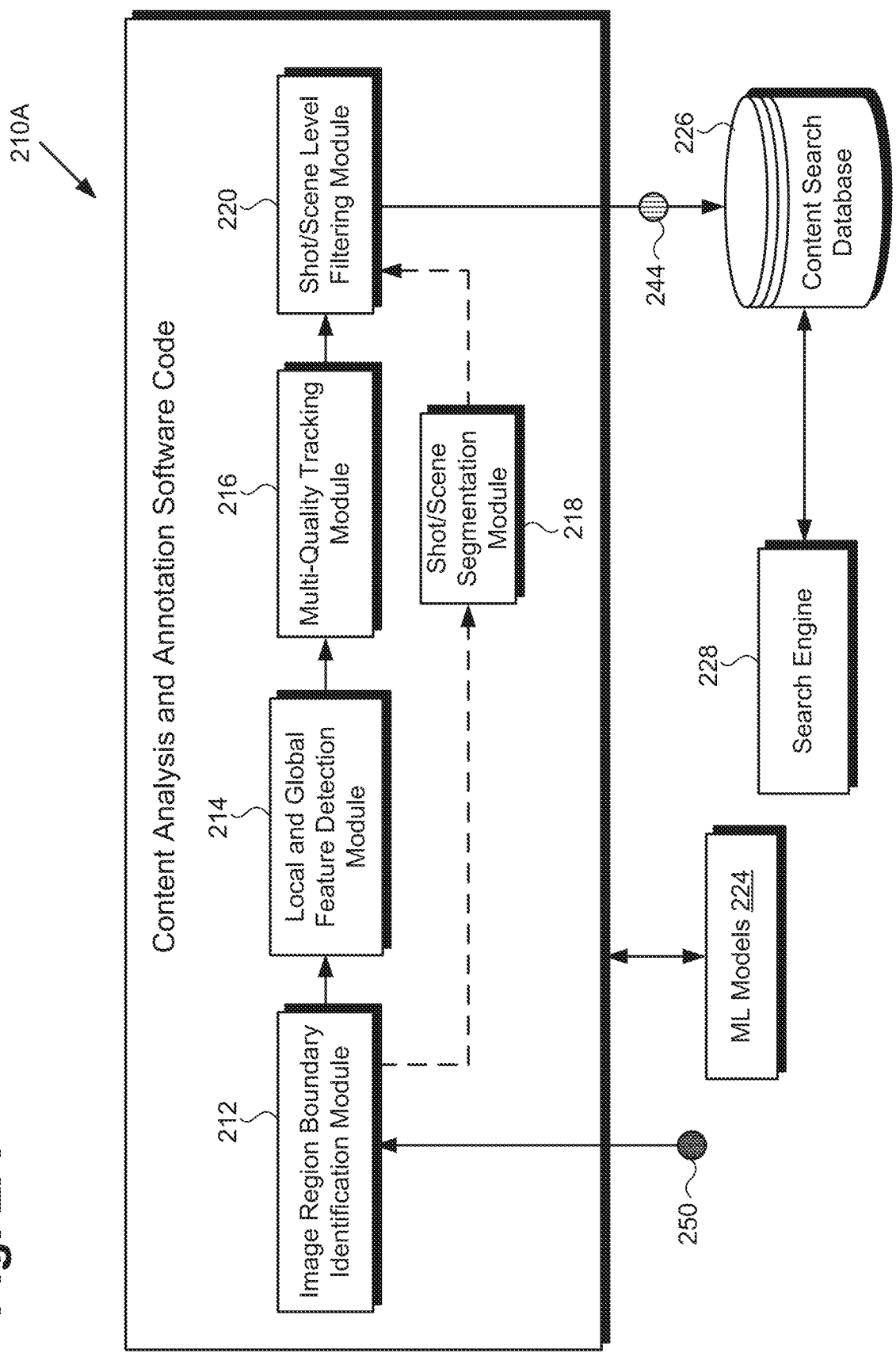
FIG. 2A shows an exemplary diagram of content analysis and annotation software code suitable for use by the system shown in FIG. 1, according to one implementation.

FIG. 2A shows an exemplary diagram of content analysis and annotation software code 210A suitable for use by system 100, in FIG. 1, according to one implementation. According to the exemplary implementation shown in FIG. 2A, content analysis and annotation software code 210A includes Image Region Boundary Identification Module 212, Local and Global Feature Detection Module 214, Multi-Quality Tracking Module 216, Shot/Scene Segmentation Module 218, and Shot/Scene Level Filtering Module 220, in addition, FIG. 2A includes trained machine learning models 224 (hereinafter "trained ML models 224"), content search database 226, and search engine 228. Also shown in FIG. 2A are content 250 processed by content analysis and annotation software code 210A, and annotated content 244 corresponding to content 250 and provided as an output by content analysis and annotation software code 210A.

Trained ML models 224, content search database 226, search engine 228, content 250, and annotated content 244 correspond respectively in general to trained ML models 124, content search database 126, search engine 128, content 138, and annotated content 144, in FIG. 1. Consequently, trained ML models 224, content search database 226, search engine 228, content 250, and annotated content 244 may share any of the characteristics attributed to respective trained ML models 124, content search database 126, search engine 128, content 138, and annotated content 144 by the present disclosure, and vice versa.

Moreover, content analysis and annotation software code 210A, in FIG. 2A corresponds in general to content analysis and annotation software code 110, in FIG. 1, and those corresponding features may share any of the characteristics attributed to either corresponding feature by the present disclosure. Thus, although not shown in FIG. 1, content analysis and annotation software code 110 may include features corresponding respectively to Image Region Boundary Identification Module 212, Local and Global Feature Detection Module 214, Multi-Quality Tracking Module 216, Shot/Scene Segmentation Module 218, and Shot/Scene Level Filtering Module 220.

It is noted that in some implementations, Image Region Boundary Identification Module 212 of content analysis and annotation software code 110/210A may be configured to utilize a trained ML model included a trained ML models 124/224 (hereinafter a "first trained ML model") to identify bounded image regions within content 150/250. In implementations in which the first trained ML model is trained to identify individual comics panels, for example, the first trained ML model may be trained on a training dataset including comics pages annotated by a human tagger. Edge detection may be performed on comics pages to extract panels having solid backgrounds and square boundaries from those pages, and that edge detection data may also be included in the training dataset. In addition, synthetic pages may be generated using the panels identified using the aforementioned techniques, i.e., human tagging and edge detection. Those synthetic pages may be generated using different compositions of comics panels, changing the backgrounds of panels, and modifying the geometry of the panels. Those synthetic pages of panels may also be included in the training set data used to train the first trained ML model.

Local and Global Feature Detection Module 214 utilizes a set of tools to extract semantic information from comics panels at different levels of granularity, i.e., the local features and global features defined above. For example, Local and Global Feature. Detection Module 214 may utilize one or more other trained ML models included among trained ML models 124/224 (hereinafter "second trained ML model(s)") to detect local features in the form of objects, such as characters and props, for example, within panels. The output of the second trained ML model(s) may be a pair of predicted labels and probability values or confidence values that can subsequently be used jointly by search engine 128/228 to rank the search results.

Local and Global Feature Detection Module 214 may utilize one or more additional trained ML models included among trained ML models 124/224 (hereinafter "third trained model(s)"), which may include a computer vision model, for example, to detect global features in the form of locations or backgrounds, for example, depicted by each panel as a whole. In one implementation, for example, such third trained ML model(s) may include a trained neural network for Connecting Text and Images, or trained "CLIP" model, which is able to project visual features and text prompts in the same latent space, thereby advantageously providing a robust and general understanding of the global context of a panel.

Multi-Quality Tracking Module 216 may use a fourth trained ML model among trained ML models 124/224 to further identify local features in a panel by comparison with corresponding local features in a preceding or subsequent panel. This may be important when local features are drawn with different qualities based on their relevance in the panel, as well as a location of a local feature within the panel (e.g., a local feature in the background may appear small and far away). In some specific cases only the main features that describe the local feature may be present a particular panel, such as the color scheme or differentiable shape (e.g., outline) of the local feature. In those extreme cases, the local feature detection performed by Local and Global Feature Detection Module 214 using the second trained ML model (s) may fail since it was, or they were, trained with more detailed examples. In order to recognize local features even in those challenging situations, the fourth trained ML model may be implemented as a re-identification model to track the same local feature over the comics panels or pages independently of its drawing qualities, using low-level features. It is noted that the expression "low-level features" refers to basic image descriptors or statistical measures such as color mean of the pixels of a region, a histogram of colors of a region, color gradients of a region, or other analysis on the pixels of a region that don't involve models or outer more complex analysis.

As a result of the foregoing, roughly drawn local features can be identified based on their previous or following detailed appearances. By way of example, an unrecognized local feature in panel "B" having the same general shape and color as an identified local feature in preceding panel "A," subsequent panel "C," or both panels "A" and "C," may be recognized by the fourth trained ML model utilized b Multi-Quality Tracking Module 216 as the same local feature identified in one or both of panels "A" and "C."

Regarding Shot/Scene Segmentation Module 218, as discussed above, sequences of comics panels may share a relationship analogous to those shared by video frames included in the same shot or scene. Comics panels are typically arranged in a page according to the time progression of the storyline and/or the reading order. Sequences of panels having a relationship analogous to shots or scenes may be identified based on similarities, such as shared local features, global features, or both. In some implementations, Shot/Scene Segmentation Module 218 may utilize a trained content segmentation ML model included among trained ML models 124/224 to identify the respective beginnings and ends of sequences of comics panels sharing relationships analogous to shots and scenes. Examples of techniques used to perform segmentation of storyboards, that may be adapted for comics panels by substituting a particular comics panel for the keyframe of a shot, are disclosed by U.S. Pat. No. 10,157,318, titled "Systems and Methods for Automatic Key Frame Extraction and Storyboard Interface Generation for Video," and issued on Dec. 18, 2018, which is hereby incorporated fully by reference into the present application.

It is noted that the process flow through Shot/Scene Segmentation Module 218 is shown by a dashed line in FIG. 2A, as well as in FIG. 2B described below, because Shot/Scene Segmentation Module 218 is an optional feature of content analysis and annotation software code 110/210A, as well as content analysis and annotation software code 110/210B, and, in some implementations may be omitted from the exemplary representations shown in FIGS. 2A and 2B. For example, in some use cases, shot/scene segmentation data identifying the respective beginnings and ends of sequences of bounded image regions included in content 150/250 that share a relationship may be predetermined and that information may be included in content 150/250.

Shot/Scene Level Filtering Module 220 may be configured to use the relationships identified by Shot/Scene Segmentation Module 218 to confirm the detection of local and global features performed by other modules, or to modify the identities of some of those local or global features. For example taking advantage of the usual time/place/character consistency inside a shot or scene, weak detections can be confirmed if there are other detections of the same class in the same shot or scene, where "class" refers to a particular type of image feature, such as a character, object, or location, for example.

In various implementations trained ML models 124/224 may report a confidence value with each identified local or global feature. For example if a trained ML model identifies character "A" with a confidence of 0.7, that means the trained ML model is seventy percent (70%) sure of the accuracy of that identification. In some implementations, a threshold may be applied to disregard identifications having confidence values less than the threshold, as those are likely to be incorrect. That is to say, feature identifications having a low confidence value with respect to a threshold confidence value according to its respective trained ML model may be removed or modified, thereby advantageously eliminating false positives from among the detected local and global features. However, it is noted that in some instances, the confidence value associated with an identified feature may be modified based on features identified in surrounding panels, for example, by increasing the confidence value if the same feature is detected in a surrounding panel or decreasing the confidence value if the feature is absent from those surrounding panels.

Figure 2B:
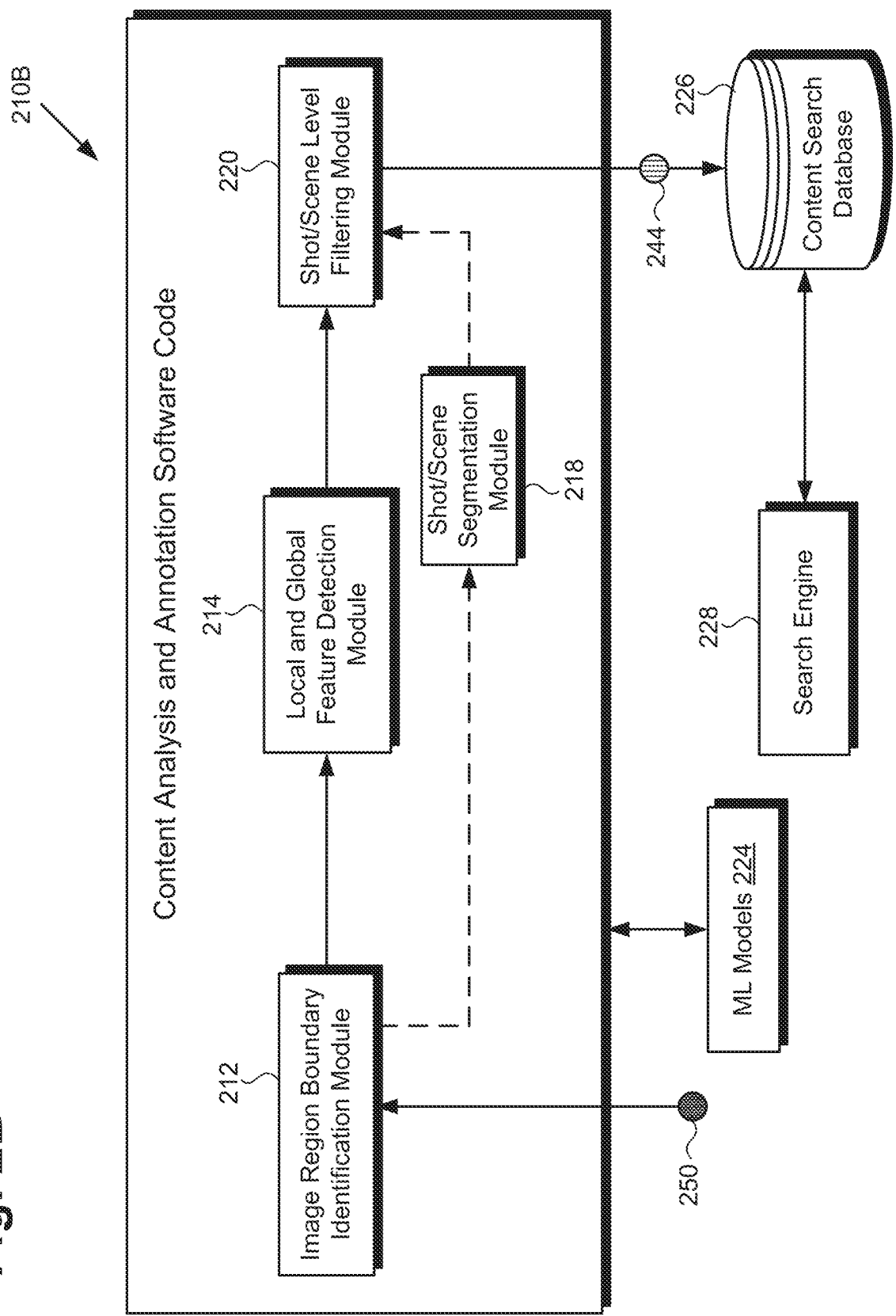
FIG. 2B shows an exemplary diagram of content analysis and annotation software code suitable for use by the system shown in FIG. 1, according to another implementation.

FIG. 2B shows an exemplary diagram of content analysis and annotation software code 210B suitable for use by system 100, in FIG. 1, according to another implementation. According to the exemplary implementation shown in FIG. 2B, content analysis and annotation software code 210B includes Image Region Boundary Identification Module 212, Local and Global Feature Detection Module 214, Shot/Scene Segmentation Module 218, and Shot/Scene Level Filtering Module 220. In addition, FIG. 2B includes trained ML models 224, content search database 226, and search engine 228. Also shown in FIG. 2B are content 250 processed by content analysis and annotation software code 210B, and annotated content 244 corresponding to content 250 and provided as an output by content analysis and annotation software code 210B.

It is noted that any features identified in FIG. 2B by reference numbers identical to those used to identify features in FIG. 2A correspond respectively to those features and may share any of the characteristics attributed to those corresponding features, above. Moreover, content analysis and annotation software code 210B corresponds in general to content analysis and annotation software code 110, in FIG. 1, and those corresponding features may share any of the characteristics attributed to either corresponding feature by the present disclosure. Thus, although not shown in FIG. 1, content analysis and annotation software code 110 may include features corresponding respectively to Image Region Boundary Identification Module 212, Local and Global Feature Detection Module 214, Shot/Scene Segmentation Module 218, and Shot/Scene Level Filtering Module 220.

In contrast to the implementation shown in FIG. 2A, content analysis and annotation software code 210B omits Multi-Quality Tracking Module 216. In general, Multi-Quality Tracking Module 216 is an advantageous feature because it may enable identification of features that were missed by Local and Global Feature Detection Module 214. However, for some use cases it might be impossible to obtain or produce a trained ML model capable of performing multi-quality tracking, and in those use cases it is typically preferable to omit Multi-Quality Tracking Module 216, as shown in FIG. 2B.

Figure 2C:
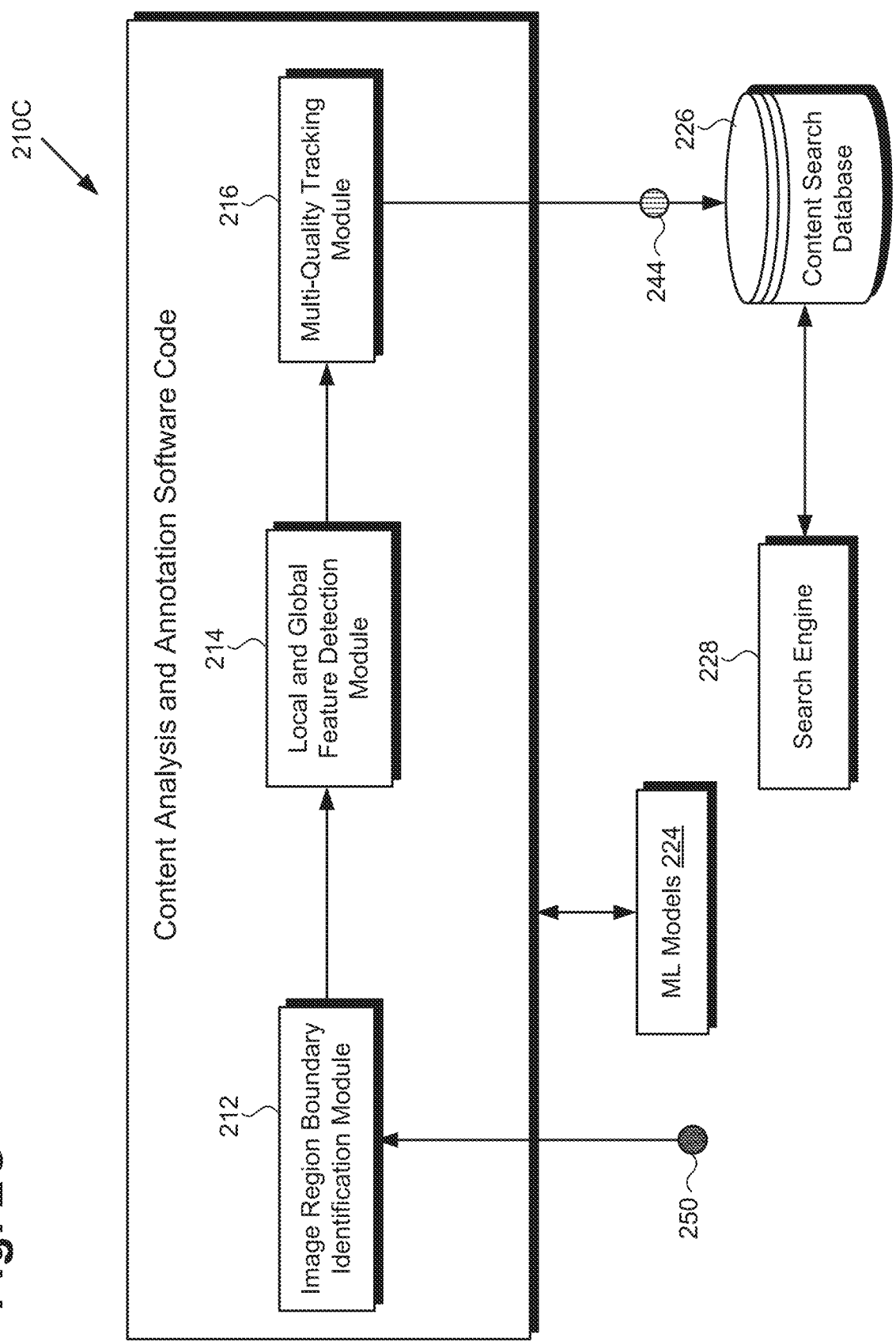
FIG. 2C shows an exemplary diagram of content analysis and annotation software code suitable for use by the system shown in FIG. 1, according to yet another implementation.

FIG. 2C shows an exemplary diagram of content analysis and annotation software code 210C suitable for use by system 100, in FIG. 1, according to yet another implementation. According to the exemplary implementation shown in FIG. 2C, content analysis and annotation software code 210C includes image Region Boundary Identification Module 212, Local and Global feature Detection Module 214, and Multi-Quality Tracking Module 216. In addition, FIG. 2C includes trained ML models 224, content search database 226, and search engine 228. Also shown in FIG. 2C are content 250 processed by content analysis and annotation softy are code 210C, and annotated content 244 corresponding to content 250 and provided as an output by content analysis and annotation software code 210C.

It is noted that any features identified in FIG. 2C by reference numbers identical to those used to identify features in FIGS. 2A and 2B correspond respectively to those features and may share any of the characteristics attributed to those corresponding features, above. Moreover, content analysis and annotation software code 210C corresponds in general to content analysis and annotation software code 110, in FIG. 1, and those corresponding features may share any of the characteristics attributed to either corresponding feature by the present disclosure. Thus although not shown in FIG. 1, content analysis and annotation software code 110 may include features corresponding respectively to Image Region Boundary Identification Module 212, Local and Global Feature Detection Module 214, and Multi-Quality Tracking Module 216.

In contrast to the implementation shown in FIG. 2A, content analysis and annotation software code 210C omits Shot/Scene Segmentation Module 218, and Shot/Scene Level Filtering Module 220. It is noted that the detection of shots and scenes by Shot/Scene Segmentation Module 218 is only used to provide input data for the filtering performed by Shot/Scene Level Filtering Module 220, so that omission of Shot/Scene Level Filtering Module 220 from content analysis and annotation software code 210C eliminates any need for Shot/Scene Segmentation Module 218. With respect to Shot/Scene Level Filtering Module 220, it is further noted that the application of shot/scene level filtering may not be advantageous for some types of visual media content. Examples of such visual media content may include a gallery of images without a storyline, or visual media content that include images lacking the relationships to one another analogous to shots or scenes. In those use cases, attempting to segment by shot/scenes and attempting to impose shot/scene level filtering might provide worse results.

Figure 3:
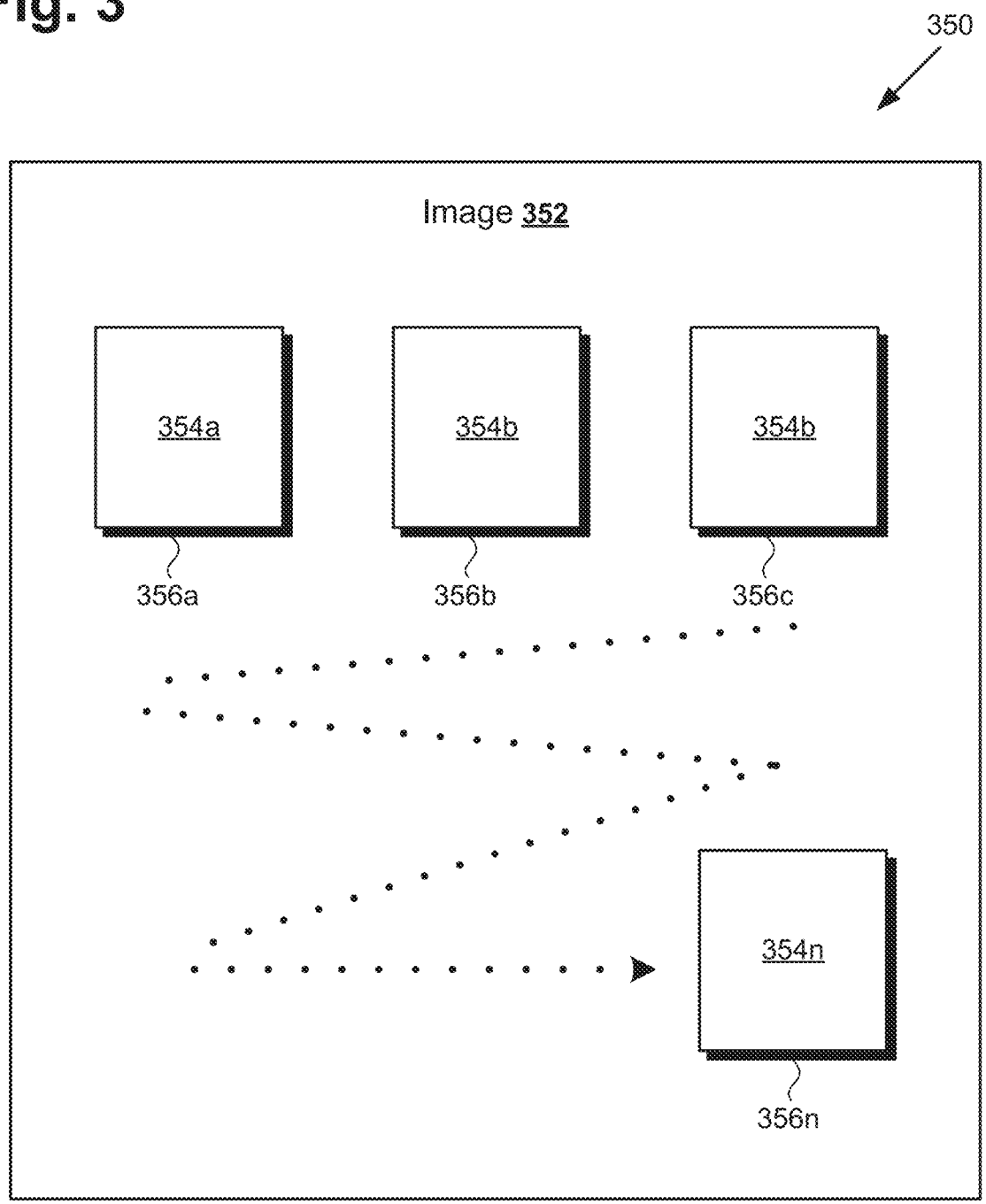
FIG. 3 shows an exemplary representation of content including an image having multiple bounded image regions, according to one implementation.

FIG. 3 shows an exemplary representation of content 350 including image 352 having multiple bounded image regions 356, according to one implementation. As shown in FIG. 3, image 352 includes image regions 354a, 354b, 354c, ..., 354n, each having a boundary, thereby establishing multiple bounded image regions 356a, 356b, 356c, ..., 356n. It is noted that content 350 corresponds in general to content 150/250, in FIGS. 1, 2A, 2B and 2C. Consequently, content 150/250 may share any of the characteristics attributed to content 350 by the present disclosure, and vice versa. That is to say, like content 350, content 150/250 may include features corresponding respectively to image 352, image regions 354a, 354b, 354c, ..., 354n, and bounded image regions 356a, 356b, 356c, ..., 356n.

Figure 4:
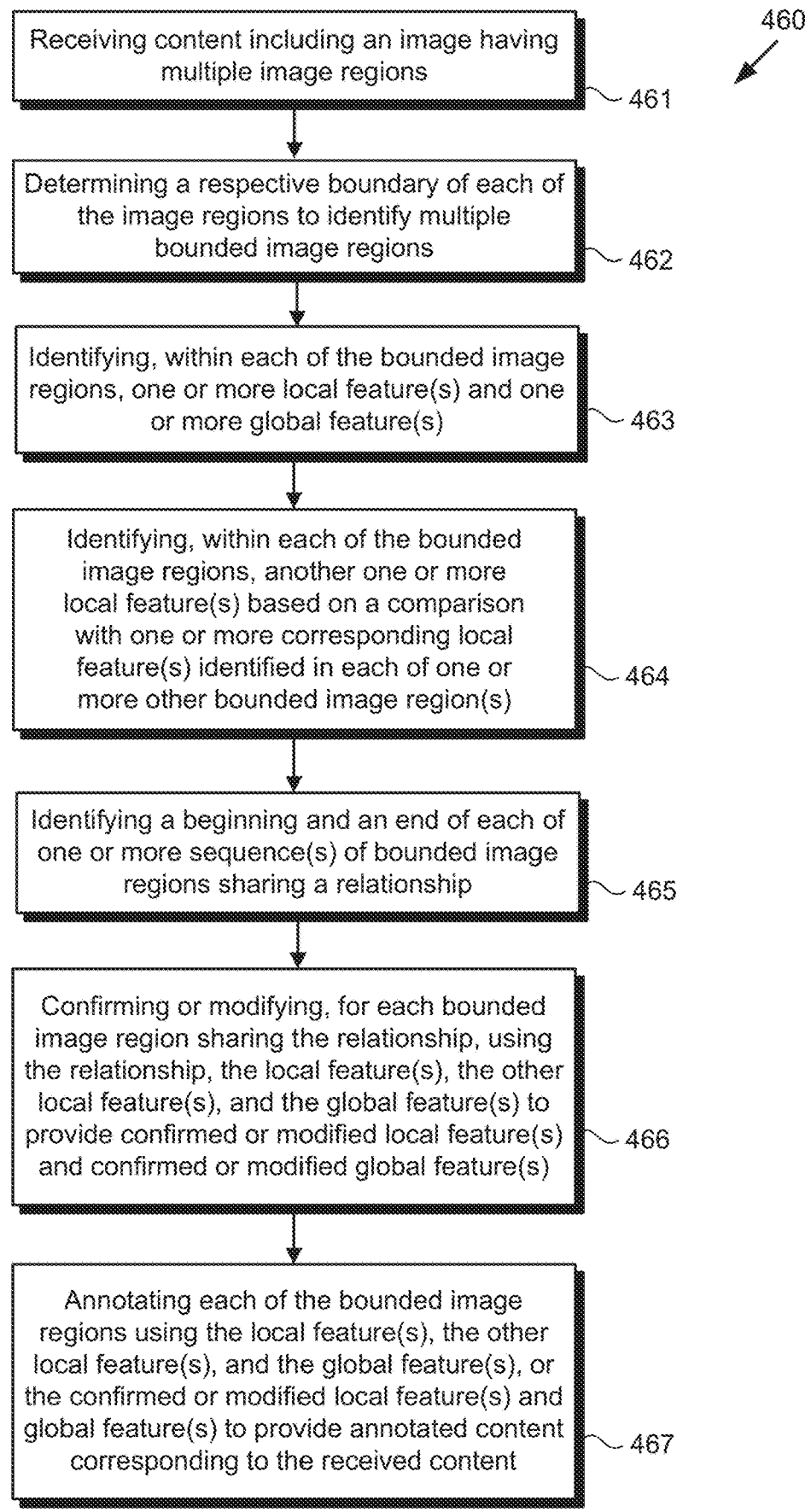
FIG. 4 shows a flowchart outlining an exemplary method for automating content analysis and annotation, according to one implementation.

The functionality of system 100 will be further described by reference to FIG. 4, FIG. 4 shows flowchart 460 presenting an exemplary method for automating content analysis and annotation, according to one implementation. With respect to the method outlined in FIG. 4, it is noted that certain details and features have been left out of flowchart 460 in order not to obscure the discussion of the inventive features in the present application. Moreover, although as noted above the present novel and inventive principles may be applied to any visual media content, such as rough sketches, photos, illustrated books, and video, for example to increase the consistency and accuracy with which annotations are applied to such content by automated annotation systems and methods, the method outlined by flowchart 460 will be described by reference to the exemplary use case of analyzing and annotating comics.

Referring now to FIG. 4 in combination with FIGS. 1, 2A, and 3, flowchart 460 begins with receiving content 150/250/350 including image 352 having multiple image regions 354a, 354b, 354c, ..., 354n (action 461). For example, content 150/250 in the form of comics may having one or more images 352 in the form of pages, each including multiple image regions 354a, 354b, 354c, ..., 354n in the form of panels. Content 150/250 may be received in action 461 by content analysis and annotation software code 110/210A, executed by processing hardware 104 of computing platform 102.

Flowchart 460 further includes determining a respective boundary of each of image regions 354a, 354b, 354c, ..., 354n of content 150/250/350 to identify multiple bounded image regions 356a, 356b, 356c, ..., 356n (action 462). Identification of multiple hounded image regions 356a, 356b, 356c, ..., 356n of content 150/250/350 may be performed in action 462 by content analysis and annotation software code 110/210A, executed by processing hardware 104 of computing platform 102, and using Image Region Boundary Identification Module 212.

As noted above by reference to FIG. 2A, in some implementations, Image Region Boundary Identification Module 212 of content analysis and annotation software code 110/210A may be configured to utilize a first trained ML model included among trained ML models 124/224 to identify bounded image regions within content 150/250. In implementations in which the first trained ML model is trained to identify individual comics panels, for example, that first trained ML model may be trained on a training dataset including comics pages annotated by a human tagger. Edge detection may be performed on comics pages to extract panels having solid backgrounds and square boundaries from those pages, and that edge detection data may also be included in the training dataset. In addition, synthetic pages may be generated using the panels identified using the aforementioned techniques, i.e., human tagging and edge detection. Those synthetic pages may be generated using different compositions of comics panels, changing the backgrounds of panels, and modifying the geometry of the panels. Those synthetic pages of panels may also be included in the training set data used to train the first trained ML model.

Flowchart 460 further includes identifying, within each of bounded image regions 356a, 356b, 356c, ..., 356n identified in action 462, one or more local features and one or more global features (action 463). As defined above, local features refer to individual objects or actions depicted within a comics panel, while global features refer to a visual impression produced by the comics panel as a whole. The identification of the one or more local features and one or more global features in each of bounded image regions 356a, 356b, 356c, . . . , 356n identified in action 462 may be performed by content analysis and annotation software code 110/210A, executed by processing hardware 104 of computing platform 102, and using Local and Global Feature Detection Module 214.

As described above by reference to FIG. 2A, Local and Global Feature Detection Module 214 utilizes a set of tools to extract semantic information from comics panels at different levels of granularity, i.e., the local features and global features defined above. For example, and also as described above, Local and Global Feature Detection Module 214 may utilize second trained ML model(s) of trained ML models 124/224 to detect local features in the form of objects, such as characters and props, for example, within panels. The output of the second trained ML model(s) may be a pair of predicted labels and probability values or confidence values that can subsequently be used jointly by search engine 128/228 to rank the search results.

As further described above, Local and Global Feature Detection Module 214 may utilize third trained ML model(s) of ML models 124/224, which may include a computer vision model, for example, to detect global features in the form of locations or backgrounds, for example, depicted by each panel as a whole. In one implementation, for example, such the third trained ML model(s) may include a trained CLIP model.

In some implementations, flowchart 460 may further include identifying, within each of bounded image regions 356a, 356b, 356c, . . . , 356n identified in action 462 (e.g., bounded image region 356b), another one or more local features based on a comparison with corresponding local features identified in each of one or more other bounded image regions of content 150/250 (e.g., bounded image region 356a and/or 356c) (action 464). It is noted that action 464 is optional, and in some implementations may be omitted from the method outlined by flowchart 460, as further described below by reference to action 467. However, in implementations in which action 464 is included in the method outlined by flowchart 460, action 464 may be performed by content analysis and annotation software code 110/210A, executed by processing hardware 104 of computing platform 102, and using Multi-Quality Tracking Module 216.

As described above by reference to FIG. 2A, Multi-Quality Tracking Module 216 may use a fourth trained ML model among trained ML models 124/224 to identify additional local features in a comics panel by comparison with corresponding local features in a preceding or subsequent panel. As noted above, this may be important when local features are drawn different qualities based on their relevance in the panel, as well as a location of a local feature within the panel (e.g., a local feature in the background may appear small and far away). In some specific cases only the main features that describe the local feature may be present in a particular panel, such as the color scheme or differentiable shape (e.g., outline) of the local feature. In those extreme cases, the local feature detection performed by Local and Global Feature Detection Module 214 in action 463 may fail. In order to recognize local features even in those challenging situations, the fourth trained ML model may be implemented as a re-identification model to track the same local feature over the comics panels or pages independently of its drawing qualities, using low-level features. As a result, roughly drawn local features can be identified based on their previous or following detailed appearances. By way of example, an unrecognized local feature in panel "B" having the same general shape and color as an identified local feature in preceding panel "A," subsequent panel "C," or both panels "A" and "C," may be recognized by the fourth trained ML model utilized by Multi-Quality Tracking Module 216 as the same local feature identified in one or both of panels "A" and "C."

In some implementations, flowchart 460 may further include identifying a beginning and an end of each of one or more sequences of bounded image regions 356a, 356b, 356c, . . . , 356n sharing a relationship (action 465). It is noted that action 465 is optional, and in some implementations may be omitted from the method outlined by flowchart 460, as further described below by reference to action 467. For example, and as noted above, in some use cases, shot/scene segmentation data identifying the respective beginnings and ends of sequences of bounded image regions 356a, 356b, 356c, . . . , 356n included in content 150/250/ 350 that share a relationship may be predetermined and that information may be included in content 150/250/350. However, in implementations in which action 465 is included in the method outlined by flowchart 460, action 465 may be performed by content analysis and annotation software code 110/210A, executed by processing hardware 104 of computing platform 102, and using Shot/Scene Segmentation Module 218.

As discussed above by reference to FIG. 2A, sequences of comics panels may share a relationship analogous to those shared by video frames included in the same shot or scene. Comics panels are typically arranged in a page according to the time progression of the storyline and/or the reading order. Sequences of panels paving a relationship analogous to shots or scenes may be identified based on similarities, such as shared local features, global features, or both. As noted above, in some implementations, Shot/Scene Segmentation Module 218 may utilize a trained content segmentation ML model included among trained ML models 124/224 to identify the respective beginnings and ends of sequences of comics panels sharing relationships analogous to shots and scenes.

In some implementations, flowchart 460 may further include confirming or modifying, for each of bounded images regions of the one or more sequences of bounded image regions sharing a relationship, using that relationship, the one or more local features and the one or more global features identified in action 463, or in action 463 and optional action 464, to provide one or more confirmed or modified respective local features and one or more confirmed or modified global features (action 466). It is noted that action 466 is optional, and in some implementations may be omitted from the method outlined by flowchart 460, as further described below by reference to action 467. However, in implementations in which action 466 is included in the method outlined by flowchart 460, action 466 may be performed by content analysis and annotation software code 110/210A, executed by processing hardware 104 of computing platform 102, and using Shot/Scene Level Filtering Module 220.

As noted above by reference to FIG. 2A, Shot/Scene Level Filtering Module 220 may be configured to use the relationships identified by Shot/Scene Segmentation Module 218 or by content 150/250 to confirm the detection of local and global features performed by other modules, or to modify the identities of some of those local or global features. For example taking advantage of the usual time/place/character consistency inside a shot or scene, weak detections can be confirmed if there are other detections of the same class in the same shot or scene, as described above. In addition, detections having a low confidence value with respect to a threshold confidence value according to its respective trained ML model may be removed or modified, thereby advantageously eliminating false positives from among the detected local and global features.

Referring to flowchart 460 in combination with FIGS. 1, 2A, 2B, 2C, and 3 flowchart 460 further includes annotating each of bounded image regions 356a, 356b, 356c, . . . , 356n identified in action 462 using the local and global features identified, modified, or confirmed by content analysis and annotation software code 110/210A/210B/210C to provide annotated content 144/244 (action 467). As noted above, in some implementations, actions 464 and 465 may be omitted from flowchart 460. In those implementations, action 463 may be followed directly by action 466. For example, and as noted above, in some use cases, shot/scene segmentation data identifying the respective beginnings and ends of sequences of bounded image regions included in content 150/250 that share a relationship may be predetermined and that information may be included in content 150/250, thereby obviating the need to perform action 465.

Alternatively, in some implementations, action 464 may be omitted from flowchart 460, but flowchart 460 may include actions 465 and 466. In each of those implementations, action 467 includes annotating bounded image regions 356a, 356b, 356c, . . . , 356n identified in action 462 with the local and global features confirmed or modified in action 466 to provide annotated content 144/244, by content analysis and annotation software code 110/210B, executed by processing hardware 104 of computing platform 102. Moreover, and as depicted in FIG. 2B, in some implementations, identifying the beginning and the end of each of the one or more sequences of bounded image regions sharing a relationship using Shot/Scene Segmentation Module 218, in action 465, may be performed in parallel, i.e., substantially concurrently, with identifying one or more local features and one or more global features within each of bounded image regions 356a, 356b. 356c, . . . , 356n using Local and Global Feature Detection Module 214, in action 463.

As also noted above, in some implementations, flowchart 460 may include actions 464 and 466, but may omit action 465 for the reason described above. In those implementations, action 464 may be followed directly by action 466. Alternatively, in some implementations, flowchart 460 may include each of actions 464, 465, and 466. In each of those implementations, action 467 includes annotating bounded image regions 356a, 356b, 356c, . . . , 356n identified in action 462 with the local and global features identified in action 463, the additional local features identified in action 464, and the local or global features modified in action 466 to provide annotated content 144/244, by content analysis and annotation software code 110/210A, executed by processing hardware 104 of computing platform 102. Moreover, and as depicted in FIG. 2A, in some implementations, identifying the beginning and the end of e of the one or more sequences of bounded image regions sharing a relationship in action 465 may be performed in parallel, i.e., substantially concurrently, with one or both of identifying one or more local features and one or more global features within each of bounded image regions 356a, 356b, 356c, . . . , 356n using Local and Global Feature Detection Module 214, in action 463, and identifying the additional one or more local features within each of bounded image regions 356a, 356b, 356c, . . . , 356n using Multi-Quality Tracking Module 216, in action 464.

Referring to FIGS. 2C, 3, and 4 in combination, in some implementations, flowchart 460 may include action 464, but may omit actions 465 and 466. In those implementations, action 464 may be followed directly by action 467. In those implementations, action 467 includes annotating bounded image regions 356a, 356b, 356c, . . . , 356n identified in action 462 with the local and global features identified in action 463, as well as the additional local features identified in action 464 to provide annotated content 144/244, by content analysis and annotation software code 110/210C, executed by processing hardware 104 of computing platform 102. Thus, in various implementations, annotated content 144/244 may take the form of annotated comics, which may include annotated mango, for example.

Figure 5:
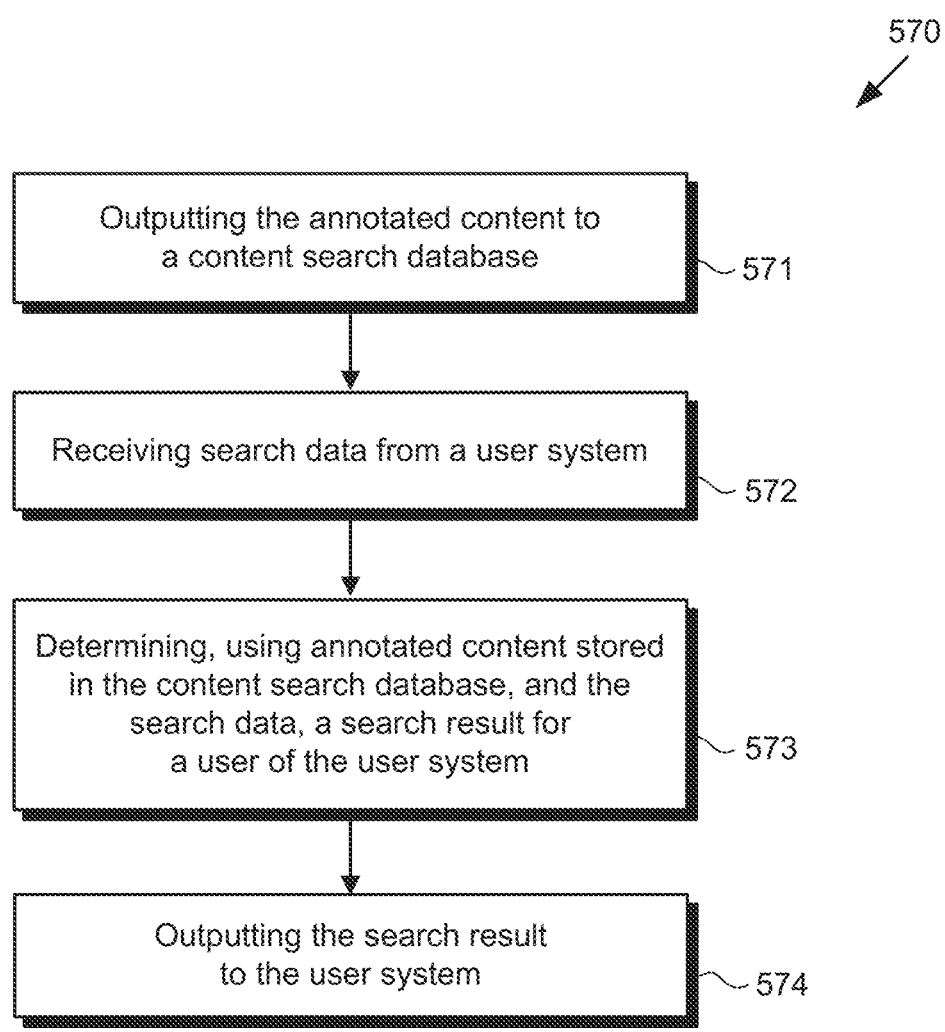
FIG. 5 shows a flowchart describing exemplary actions for extending the method outlined in FIG. 4, according to one implementation.

Referring now to FIG. 5, FIG. 5 shows flowchart 570 describing exemplary actions for extending the method outlined in FIG. 4, according to one implementation. With respect to the actions described in FIG. 5, it is noted that certain details and features have been left out of flowchart 570 in order not to obscure the discussion of the inventive features in the present application. Referring to FIGS. 1, 2A, 2B, and 2C, as noted above, in some implementations, system 100 includes one or both of content search database 126/226 and search engine 128/228. In various implementations, search engine 128/228 may be configured to identify content having features sought by user 108, based on search data 142 received from user 108.

In those implementations, processing hardware 104 of computing platform 102 may execute content analysis and annotation software code 110/210A/210B/210C to output annotated content 144/244 to content search database 126/226 (action 571). Flowchart 570 further includes receiving search data 142 from user system 140 (action 572). Search data 142 may include data identifying local features, global features, or local and global features of content sought by user 108. As shown in FIG. 1, search data 142 may be received by system 100 from user system 140 utilized by user 108, via communication network 130 and network communication links 132. Action 572 may be performed by search engine 128/228, executed by processing hardware 104 of computing platform 102.

Flowchart 570 further includes determining, using annotated content 144/244 stored in content search database 126/226, search result 146 for user 108 of user system 140 (action 573). Determination of search result 146 in action 573 may be performed by search engine 128/228, executed by processing hardware 104 of computing platform 102, and using content search database 126/226.

Referring to the exemplary use case in which content 150/250 takes the form of comics, it is noted that by the nature of the comics there exists a hierarchy to the content including: 1) comic issues formed by 2) images, i.e., pages, and 2) pages formed by 3) bounded image regions, i.e., panels. When searching for annotated content 144/244 search engine 128/228 may be configured to query content search database 126/226 at three different levels of the hierarchy: issues, pages, and panels, and can take advantage of the hierarchy to yield results.

When searching at the comics issue level, comics issue metadata, which may be included in content 150/250 or may be obtained separately from content source 134, for instance, e.g., the title, synopsis, author, and the like of content 150/250, may be used for search purposes, as well as an aggregation of results of performing the search at page and panel level. That is to say, when searching at issue level, page and panel metadata are also taken into account, but they are aggregated to issue level. When performing issue level searching, the aggregation of search results at panel level as part of that issue level searching may be based on the number of results in a comic issue, as well as the quality of those results. Thus, in this aggregation, the number of results and their quality obtained at panel or page level influences the ranking of the result at issue level. It is noted that user 108 can select at which level, i.e., issues, pages, or panels, a search is performed. But for all levels, issue level information, page level information, and panel level information are taken into consideration, what changes is how each type of information is handled at the different search levels.

For example if comics "character A" is searched for at issue level, search engine 128/228 may return results that have "character A" in the tide or synopsis, as well as results in which character A is detected as appearing on one or more pages in one or more comics panels. When sorting those results, comics issues in which character A appears in many panels will typically be ranked higher than comics issues in which character A appears in a few panels. In other words, comics issues appearing in the search results may be ranked according to a frequency of the presence of the search data at the page or panel level. Issues in which character A appears with high ML model confidence values will also typically be ranked higher than those having low ML model confidence values, where an ML model confidence value is considered high or low with respect to a threshold confidence value.

It is noted that confidence value is typically the first indicator for ranking, with the number of results being second. Consequently, an issue with character A in only a few panels but identified with high confidence values should be ranked higher than a second issue with character A in more panels but with low confidence values. Nevertheless, the second issue has a much higher number of appearances of character A than the first issue, or the confidence values for the second issue are not significantly lower than those of the first issue, the second issue could be ranked higher because the higher number of appearances might compensate for the lower confidence values.

As noted above, searching at any level, issue level information, page level information, and panel level information are all taken into considerations. Thus, when searching at panel level, both issue level and page level information are taken into account. It is noted that there are two distinct types of assessment being performed, one based on confidence value, and another based on search score. As noted above, confidence value refers to the level of confidence with which a trained ML model has identified a particular local or global feature. The search score, by contrast, is used to sort the search results, and may be based on confidence values applied to features, the frequency with which a particular feature appears in panels, or any combination of those metrics.

The search score of a given panel may be influenced by adjacent panels (in reading order), particularly panels identified as sharing a relationship with the given panel akin to shot scene relationships among video frames. Search scores may be determined for all panels. Then, for each panel, its score may be modified according to the adjacent and related panels, other panels of the comics issue, and the comics issue metadata. By way of example, when parcels are searched for character A, the score for a panel in which character A appears in the previous and subsequent panels is increased. However, for a panel sharing a relationship with other panels and having a low confidence value for the presence of character A. other panels sharing that relationship may have their search scores reduced.

Flowchart 570 further includes outputting search result 146 to user system 140 (action 574). For example, in implementations in which search data 142 received in action 572 includes a search for comics, search result 146 for user 108 may identify comics, which may include graphical novels and manga. As shown in FIG. 1, search result 146 may be output to user system 140 utilized by user 108 by system 100, via communication network 130 and network communication links 132. Action 574 may be performed by search engine 128, executed by processing hardware 104 of computing platform 102.

Thus, the present application discloses systems and methods for automating content analysis and annotation. The solution disclosed in the present application advances the state-of-the-art by increasing the speed, consistency, and accuracy with which annotations can be applied to visual media content in the form of comics, rough sketches, photos, illustrated books, and video. Moreover, when used in conjunction with a search engine, the present solution can be used to increase the relevance of content surfaced for a user relative to the search criteria specified by the user, thereby advantageously enhancing the user's productivity.

From Front the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform having a processing hardware and a system memory storing a software code;
   the processing hardware configured to execute the software code to:
      receive content including an image having a plurality of image regions;
      determine, using a machine learning (ML) model, a respective boundary of each of the plurality of image regions to identify a plurality of bounded image regions, wherein the ML model is trained using training data including synthetic images generated from previously detected image regions of other real images;
      identify, within each of the plurality of bounded image regions, respective one or more local features and respective one or more global features, wherein the plurality of bounded image regions include at least one sequence of bounded image regions sharing a relationship in which a respective perspective from which the at least one sequence of bounded image regions are drawn does not change, but wherein the respective one or more local features portrayed within the at least one sequence of bounded image regions change;

identify, within each of the plurality of bounded image regions, another respective one or more local features based on a comparison with corresponding one or more local features identified in each of one or more other bounded image regions; and annotate each of the plurality of bounded image regions using the respective one or more local features, the another respective one or more local features, and the respective one or more global features to provide an annotated content.

2. The system of claim 1, wherein the ML model is a first trained ML model of a plurality of trained ML models, and wherein the processing hardware is further configured to execute the software code to:

identify, within each of the plurality of bounded image regions, the respective one or more local features using one or more second trained ML model(s) of the plurality of trained ML models;

identify, within each of the plurality of bounded image regions, the respective one or more global features using one or more third trained ML model(s) of the plurality of trained ML models; and identify, within each of the plurality bounded image regions, the another respective one or more local features using a fourth trained ML model of the plurality of trained ML models.

3. The system of claim 1, wherein, before annotating each of the plurality of bounded image regions included in the at least one sequence, the processing hardware is further configured to execute the software code to:

confirm or modify, using the relationship, for each of the bounded images regions of the at least one sequence of bounded image regions sharing the relationship, the respective one or more local features, the another respective one or more local features, and the respective one or more global features to provide confirmed or modified respective one or more local features and confirmed or modified respective one or more global features; and annotate each of the bounded image regions of the at least one sequence of bounded image regions sharing the relationship further using at least the modified respective one or more local features or the modified respective one or more global features.

4. The system of claim 1, wherein the processing hardware is further configured to execute the software code to:

identify a beginning and an end of each of the at least one sequence of bounded image regions sharing the relationship.

5. The system of claim 4, wherein the processing hardware is further configured to execute the software code to:

identify the beginning and the end of each of the at least one sequence of bounded image regions sharing the relationship using a trained content segmentation machine learning (ML) model.

6. The system of claim 4, wherein the processing hardware is further configured to execute the software code to:

identify the beginning and the end of each of the at least one sequence of bounded image regions sharing the relationship, in parallel with identifying the respective one or more local features and the respective one or more global features within each of the plurality of bounded image regions and identifying the another respective one or more local features within each of the plurality bounded image regions.

7. The system of claim 1, wherein the annotated content comprises at least one of an annotated comic, an annotated graphic novel, or an annotated manga.

8. A system comprising:

a computing platform having a processing hardware and a system memory storing a software code;

the processing hardware configured to execute the software code to:

receive content including an image having a plurality of image regions at least some of which form a sequence of image regions sharing a relationship in which a perspective from which the sequence of image regions are drawn does not change, but wherein one or more local features portrayed within the at least one sequence of bounded image regions change;

determine, using a machine learning (ML) model, a respective boundary of each of the plurality of image regions to identify a plurality of bounded image regions, wherein the ML model is trained using training data including synthetic images generated from previously detected image regions of other real images;

identify, within each of the plurality of bounded image regions, respective one or more local features and respective one or more global features;

confirm or modify, using the relationship, for each of the bounded image regions corresponding respectively to the image regions sharing the relationship, the identified respective one or more local features and the identified respective one or more global features to provide confirmed or modified respective one or more local features and confirmed or modified respective one or more global features; and annotate each of the bounded image regions corresponding respectively to the image regions sharing the relationship, using the confirmed or modified respective one or more local features and the confirmed or modified respective one or more global features to provide an annotated content.

9. The system of claim 8, wherein the ML model is a first trained ML model of a plurality of trained ML models, and wherein the processing hardware is further configured to execute the software code to:

identify, within each of the plurality of bounded image regions, the respective one or more local features using one or more second trained ML model(s) of the plurality of trained ML models; and identify, within each of the plurality of bounded image regions, the respective one or more global features using one or more third trained ML model(s) of the plurality of trained ML models.

10. The system of claim 8, wherein the processing hardware is further configured to execute the software code to:

identify a beginning and an end of the sequence of image regions sharing the relationship.

11. The system of claim 10, wherein the processing hardware is further configured to execute the software code to:

identify the beginning and the end of the sequence of image regions sharing the relationship using a trained content segmentation machine learning (ML) model.

12. The system of claim 10, wherein the processing hardware is further configured to execute the software code to:

identify the beginning and the end of the sequence of image regions sharing the relationship in parallel with identifying the respective one or more local features and the respective one or more global features within each of the plurality of bounded image regions.

13. The system of claim 8, wherein the annotated content comprises at least one of an annotated comic, an annotated graphic novel, or an annotated manga.

14. A method for use by a system including a computing platform having a processing hardware, and a system memory storing a software code, the method comprising:
- receiving, by the software code executed by the processing hardware, content including an image having a plurality of image regions;
- determining, by the software code executed by the processing hardware and using a machine learning (ML) model, a respective boundary of each of the plurality of image regions to identify a plurality of bounded image regions, wherein the ML model is trained using training data including synthetic images generated from previously detected image regions of other real images;
- identifying, by the software code executed by the processing hardware within each of the plurality of bounded image regions, respective one or more local features and respective one or more global features, wherein the plurality of bounded image regions include at least one sequence of bounded image regions sharing a relationship in which a respective perspective from which the at least one sequence of bounded image regions are drawn does not change, but wherein the respective one or more local features portrayed within the at least one sequence of bounded image regions change;
- identifying, by the software code executed by the processing hardware within each of the plurality of bounded image regions, another one or more local features based on a comparison with corresponding one or more local features identified in each of one or more other bounded image regions; and
- annotating, by the software code executed by the processing hardware, each of the plurality of bounded image regions using the respective one or more local features, the another respective one or more local features, and the respective one or more global features to provide an annotated content.

15. The method of claim 14, wherein the ML model is a first trained ML model of a plurality of trained ML models, the method further comprising:
- identifying, by the software code executed by the processing hardware, the respective one or more local features within each of the plurality of bounded image regions using one or more second trained ML model(s) of the plurality of trained ML models;
- identifying, by the software code executed by the processing hardware, the respective one or more global features within each of the plurality of bounded image regions using one or more third trained ML model(s) of the plurality of trained ML models; and
- identifying, by the software code executed by the processing hardware, the another respective one or more local features within each of the plurality bounded image regions using a fourth trained ML model of the plurality of trained ML models.

16. The method of claim 14, further comprising, before annotating each of the plurality of bounded image regions included in the at least one sequence:
- confirming or modifying, for each of the bounded images regions of the at least one sequence of bounded image regions sharing the relationship, by the software code executed by the processing hardware and using the relationship, the respective one or more local features, the another respective one or more local features, and the respective one or more global features to provide confirmed or modified respective one or more local features and confirmed or modified respective one or more global features; and
- annotating, by the software code executed by the processing hardware, each of the bounded image regions of the at least one sequence of bounded image regions sharing the relationship further using at least the modified respective one or more local features or the modified respective one or more global features.

17. The method of claim 14, the method further comprising:
- identifying, by the software code executed by the processing hardware, a beginning and an end of each of the at least one sequence of bounded image regions sharing the relationship.

18. The method of claim 17 further comprising:
identifying the beginning and the end of each at least one sequence of bounded image regions sharing the relationship using a trained content segmentation machine learning (ML) model.

19. The method of claim 17, further comprising:
identifying the beginning and the end of each of the at least one sequence of bounded image regions sharing the relationship, in parallel with identifying the respective one or more local features and the respective one or more global features within each of the plurality of bounded image regions and identifying the another respective one or more local features within each of the plurality bounded image regions.

20. The method of claim 14, wherein the annotated content comprises at least one of an annotated comic, an annotated graphic novel, or an annotated manga.

* * * * *